Nov. 4, 1958

W. ELLIS 2,859,379

FEEDBACK NETWORK FOR CORRECTING DISTORTION DUE TO
MAGNETIC CHARACTERISTICS OF DEFLECTION YOKES

Filed May 16, 1955

INVENTOR.
WRIGHT ELLIS

BY *George Sipkin*
*George E. Pearson*
ATTORNEYS

Nov. 4, 1958 W. ELLIS 2,859,379
FEEDBACK NETWORK FOR CORRECTING DISTORTION DUE TO
MAGNETIC CHARACTERISTICS OF DEFLECTION YOKES
Filed May 16, 1955 2 Sheets-Sheet 2
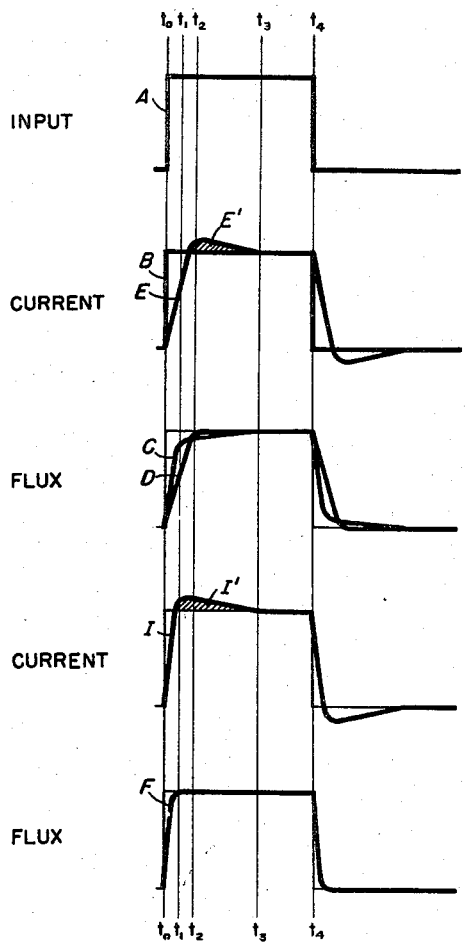
INPUT
*Fig. 3*
CURRENT
*Fig. 4*
FLUX
*Fig. 5*
CURRENT
*Fig. 6*
FLUX
*Fig. 7*
*Fig. 9*
*Fig. 8*
SHAPED VOLTAGE
COIL VOLTAGE
CURRENT
*Fig. 10*
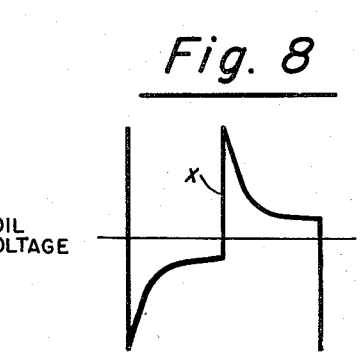
INVENTOR.
WRIGHT ELLIS
BY George Sipkin
George E. Pearson
ATTORNEYS United States Patent Office 2,859,379
Patented Nov. 4, 1958

2,859,379

FEEDBACK NETWORK FOR CORRECTING DISTORTION DUE TO MAGNETIC CHARACTERISTICS OF DEFLECTION YOKES

Wright Ellis, San Diego, Calif.

Application May 16, 1955, Serial No. 508,834

14 Claims. (Cl. 315—27)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic deflection yokes and more particularly to circuitry for correcting that distortion in the magnetic field of a magnetic yoke which is caused by characteristics inherent in the core material.

It is well known that the current in a coil which is supplied with a varying input signal will not be linearly related to the signal but will be distorted by the reactance of the coil. Such distortion is undesirable and will result in inaccuracies in the deflection of a cathode ray beam which is to be controlled by the magnetic field of the coil. There have been devised numerous circuits to correct for coil current distortion due to inductive and capacitative reactance of the coil and for impedance changes due to ambient temperature variations. Such circuits normally incorporate a negative feedback arrangement specifically designed to cause the shape of the current in the coil to precisely conform to the input wave form.

During experiments designed to improve the rise time and slope characteristics of square wave cathode ray tube displays using magnetic deflection type yokes, observations were made which could not be explained in terms of coil reactance. When the magnetizing current in the coil is changed very rapidly from one steady state to another, the resultant flux undergoes a long time delay in reaching its new steady state condition. This results in a serious distortion of square wave presentation because of the lag between the rise in the flux in the core and the rise in coil current. Therefore, identity of input and coil current waveform cannot prevent distortion of the magnetic field when the coil has a magnetic core. It will be seen then that some prior corrective feedback circuits may be designed to function satisfactorily with an air core deflection coil but will not effect optimum linearity in the field of a coil having a magnetic core.

The present invention comprises a gain-stabilized yoke driving amplifier circuit that includes the deflection yoke (coil and core) in the inverse feedback loop which corrects for all effects represented by the current flowing through the coil to thereby tend to effect linearity of the coil current. A second feedback loop obtains a voltage developed across the coil and of opposite polarity thereto, shapes this voltage and then feeds the amplifier input whereby the distortion due to the lag between the rise time of the core flux and the rise time of the coil current is substantially reduced.

It is an object of this invention to provide means for producing a high degree of linearity in a cathode ray deflection circuit.

It is a further object of this invention to correct for distortion which is caused by the magnetic core material of a deflection yoke.

Another purpose of this invention is the provision of a deflection yoke amplifier circuit which includes means for avoiding distortion due to the lag in the core flux relative to the coil current.

A further object of this invention is the provision of means for adding to the current in the coil of a deflection yoke a shaped corrective wave which effects a decrease in the rise time of the core flux.

Another purpose of this invention is to increase the frequency usefulness of the deflection yoke of a cathode ray tube.

Still another object of this invention is the provision of an accurately controlled beam of a cathode ray tube.

Other objects and many of the attendant advantages of this invention will be readily appreciated as the same becomes better understood by reference to the following detailed description when considered in connection with the accompanying drawings wherein:

Figs. 3 to 10 illustrate various waveforms of current, voltage and flux at various points of the circuit of Fig. 1.

Figure 1:
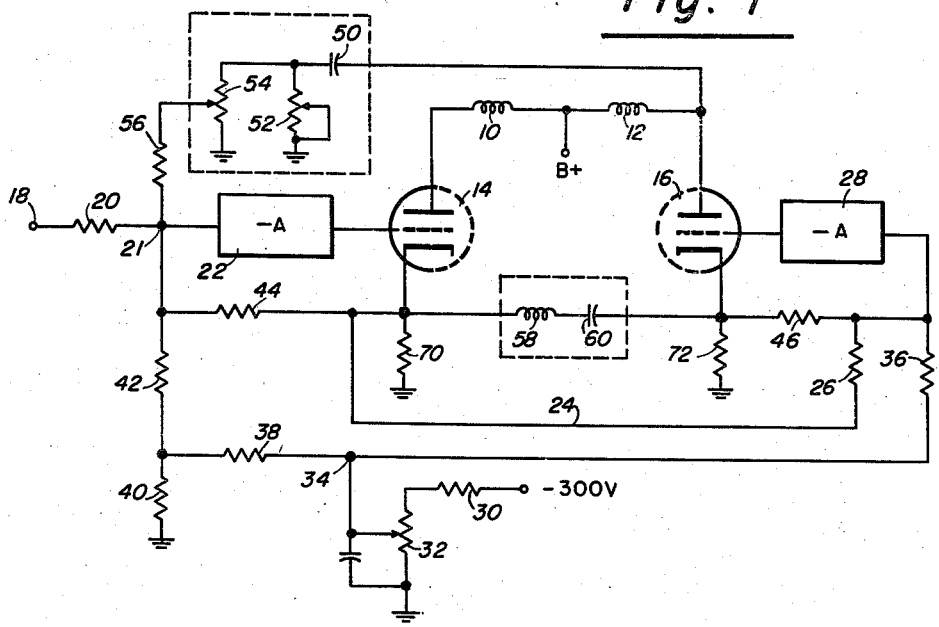
Fig. 1 is a circuit diagram, partly in block form, of one embodiment of this invention.

In the form of the invention shown in Fig. 1, a pair of opposed deflection coils 10, 12, each having a core of magnetic material, are connected between the anodes of tubes 14, 16 which are supplied with a positive voltage fed to the junction of the coils from a source not shown. A varying signal is supplied at terminal 18 and fed through resistor 20 to input 21 of a wide band, direct coupled negative amplifier 22 which feeds the control grid of tube 14.

Figure 2:
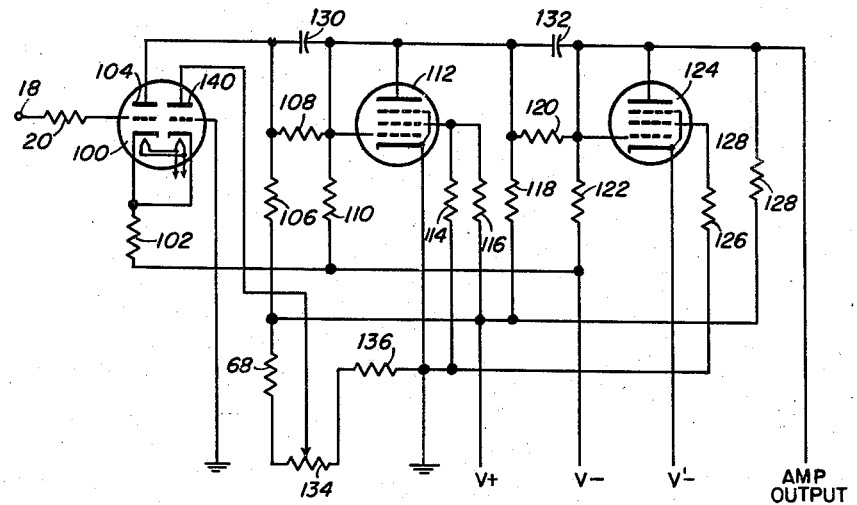
Fig. 2 is a circuit diagram of the amplifier shown in block form in Fig. 1.

As shown in Fig. 2, amplifier 22 comprises a cathode compensated tube 100 which receives an input from point 21 to one of the control grids thereof, the second grid being grounded. The cathodes of the tube are supplied from a negative supply V— with a voltage such as —300 v. through resistor 102. Both filaments in the tube envelope are fed from the same voltage source so that the effect of a filament and cathode temperature rise which increases the gain of the tube is compensated. Any variation on the grounded grid of one half of the tube due to the always equal temperature rise of both cathodes will appear with opposite polarity on the signal grid of the other half whereby the quiescent operating point of the tube is temperature stabilized. Plate 104 is fed through resistor 106 from a positive potential supply V+ of a voltage such as 300 v. Voltage dividing resistors 108, 110 are coupled between plate 104 and the negative voltage supply V— whereby the control grid of tube 112 is supplied with a bias such as —1.5 v. The screen grid of tube 112 is coupled with ground and the positive supply V+ through resistors 114, 116 respectively while the cathode is grounded and the plate is fed through resistor 118 from V+. Coupling voltage dividing resistors 120, 122 feed the control grid of tube 124 which has its cathode supplied with a negative potential from a source V¹— such as —150 v., its screen grid grounded through resistor 126, and its plate fed through resistor 128 from the positive source V+. Capacitors 130, 132 are coupled across resistors 108, 120 respectively for the purpose of feeding high frequency components from plate to grid of consecutive stages. Potentiometer 134 is coupled between ground and the positive source through resistors 136, 138 respectively and feeds to plate 140 of tube 100 a positive potential which is adjusted to provide zero output at the plate of tube 124 with zero signal input to tube 100.

The negative amplifier having an odd number of direct coupled tubes produces at the plate of tube 124 a signal which is fed to the grid of tube 14 and is of opposite polarity with respect to the polarity of the input signal (at point 21). From the cathode of tube 14 through lead 24 and resistor 26 is obtained (at point 27) part of the input to amplifier 28 which is of opposite polarity with respect to the signal input at point 21 to amplifier 22. The two amplifiers are identical and thus the tubes 14, 16 are driven 180° out of phase. Similarly the waveforms of the energy in the coils 10, 12 are of opposite polarity and the coils are located on opposite sides of the beam to be deflected whereby their respective magnetic fields deflect the beam in amount and in a direction directly related to the difference between the energy in the respective fields. Thus the current in one coil increases simultaneously with a decrease in current in the other coil thereby providing a varying resultant magnetic force on the deflected beam.

To cause tubes 14, 16 to operate in class A on the proper portion of their characteristic curves there is supplied a steady bias from a regulated source of negative potential (not shown) through resistor 30, variable resistor 32 to a point 34. The full voltage at point 34 is fed through resistor 36 to the input (at point 27) of amplifier 28 while half of the voltage at point 34 is dropped across resistor 38 and the other half is picked off across resistor 40 (equal to resistor 38) and fed through resistor 42 (equal to resistor 36) to the input (at point 21) of amplifier 22. Since the negative bias voltage fed to amplifier 22 will appear via lead 24 as a positive voltage at an input of amplifier 28 the latter is fed with a negative bias equal to twice the negative bias fed to amplifier 22 whereby the net bias for the tubes 14, 16 is equal in magnitude and polarity.

While amplifiers 22, 28 have good linearity and are substantially free of distortion the coil currents will be distorted with respect to the input signal because of the reactance of the coils. To eliminate this distortion (and any distortion remaining in the amplifiers) and effect linearity of the coil currents relative to the input signal, there is provided for each coil a negative current feedback loop which includes resistors 44, 46 respectively coupled between the cathodes of tubes 14, 16 and amplifiers 22, 28. For all effects of the deflection coil that are represented by the current, the coil may be considered to be in the feedback loop in this type of coil driving circuit. Therefore, the amplifier will produce the proper driving current in the coil, in reference to its reactive components, for any input wave shape or frequency that is consistent with the minimum rise time of the deflection yoke.

The circuit described thus far will have a loop voltage gain from point 18 to the cathode of tube 14 which is very nearly equal to unity since the amplifiers shown in Fig. 2 have a gain on the order of 100,000 and resistors 20, 44, 46 and 26 are equal. Actually the voltage across the relatively small and equal cathode resistors 70, 72 of tubes 14, 16 will be equal in magnitude to the input voltage at point 18 less the ratio of this voltage to the voltage gain of amplifier 22. The polarity is of course reversed. With the amplifier 22 haveng a gain of 100K the variation from unity of gain will be the negligible product of the input voltage at point 18 and the reciprocal of the voltage gain ($E/100K$).

The circuit thus far described will produce a coil current wave shape that precisely conforms to the shape of the input signal. However, the high frequency components of the input signal such as those at the steeper portions of a square wave or sawtooth wave introduce a distortion in the movement of the deflected beam even with a perfectly linear coil current. This effect is a function of the magnetic core material of the yoke, is not completely represented by the current flowing through the coil and therefore is not avoided by the negative feedback loop. For an exposition of manner in which this core effect is manifested, reference is made to Figs. 3–10 which depict various waveforms which occur with an input signal which takes the form of the square wave A. Due to the operation of the negative feedback loop, the reactive distortion is eliminated and the coil current is linear as shown by wave B. With a current in the coil such as that shown by wave B the resultant flux in the coil core of a deflection yoke such as the type Y15–5 #L442 sold by Synchronics Instrument Company will have the wave shape of flux curve C. It will be noted that the flux initially rises quite steeply but nevertheless lags the rise in coil current and then at time $t_1$ which represents a delay time on the order of 100 microseconds, sharply decreases its rate of rise but continues to rise for a total time on the order of 2 milliseconds until time $t_3$ when it reaches a final level or steady state where it remains as long as the coil current remains constant. Thus while the coil current rises almost instantaneously, the average rate of change of the flux to its final level is much less than the rate of change of the coil current and the flux change lags the current change by time $t_0$–$t_3$ which may be as much as 2 milliseconds. This delay in flux rise is a function of the core material and is independent of the frequency of repetition rate of the input signal within the limits of the particular coil. At low frequencies the wave period (or half period) $t_0$–$t_4$ may be much greater than time $t_0$–$t_3$, the rise time of the flux, whereby the distortion exists for a relatively small percentage of the wave period. However, as the frequency increases the fixed rise time $t_0$–$t_3$ becomes a greater proportion of the wave period and the effect thereby is more undesirable. It has been found that this rise time of the flux increases with increases in the magnitude of the flux change and the amplitude of the coil current change while it decreases as the magnitude of the coil current or flux change decreases.

If the coil current be driven beyond its condition of linearity B to a wave form such as shown by coil current curve E, the corresponding flux curve D will be produced. While the flux of curve D initially rises less rapidly than the flux of curve C the total rise time of the curve D is $t_0$–$t_2$, substantially less than the total time $t_0$–$t_3$ of rise of the flux of curve C.

With a linear coil current in coil 10 such as shown by curve B the voltage across the coil 12 as shown by curve X will be sharply peaked because of the sharp increase of coil impedance with abrupt current changes. This voltage X when fed to a differentiator will appear across the resistor thereof in the form of curve Y.

The curves X, Y and L of Figs. 8–10 are shown at a higher frequency (shorter period) than the curves of Figs. 3–7 in order to more clearly illustrate the fact that, at higher frequencies, the core lag distortion (and the correction therefore) exists for a larger portion of the wave period. With the lower frequency indicated in Figs. 3–7 there is a time $t_3$–$t_4$ which is distortion free in the absence of shaped corrective voltage as indicated by curve C while at the higher frequency indicated by the curves Figs. 8–10 the correction and distortion may exist for the entire half period. It will be seen that the shaded portion $Y^1$ of curve Y has the same polarity as the signal input at point 18 and in effect constitutes a regenerative feedback when introduced at point 18. It is this shaded portion which produces the shaded portion $E^1$ of current curve E. As shown in Fig. 1 the coil current wave E is obtained by a second feedback loop which comprises capacitor 50 coupled to the anode connected end of coil 12 and to one end of variable shaping resistor 52 the other end of which is grounded. Elements 50, 52 partially differentiate the voltage developed across coil 12 and preferably have an RC time constant less than one tenth of the half period of the input signal. The shape of this differentiated voltage is adjusted by varying resistor 52 while its amplitude is varied by adjustment of attenuating resistor 54. The shaped voltage is fed back into the amplifier 22 through summing resistor 56. The energy or voltage obtained by this feedback loop from coil 12 has the same shape as the energy in coil 10 but is of opposite polarity. This opposite polarity corrective wave when shaped by elements 52, 54 and fed to the amplifier input modifies the current in coil 10 and, through lead 24, the current in coil 12, to produce the wave shape E. The shape of curve E may be adjusted by varying resistor 52, 54 to produce a zero slope flux curve such as curve D for square wave input signals.

The feedback loop 50—56 itself introduces a flux rise time delay caused by portion Y" of curve Y as indicated by comparison of the wave fronts of curves C and D. This delay time may be improved by increasing the current gain of the circuit for high frequencies and is accomplished in the illustrated embodiment of this invention by coupling a series connected inductance 58 and variable capacitor 60 between the cathodes of the current output tubes 14, 16. Increasing capacitance 60 will tend to bring the flux curve D back and increase the steepness of the wavefront thereof until an optimum shape such as that of flux curve F is obtained. Elements 58, 60 tend to effect a coil current component such as shown by curve L which when added to coil current E produces the final coil current I and flux F. The combination of the two circuits which respectively include elements 50—56 and elements 58—60 yields the final flux curve F which has a greatly decreased rise time $t_0$–$t_1'$ which substantially equals the rise time $t_0$–$t_1$ of the initial portion of the flux produced by the linear coil current B. At time $t_1'$ the flux of courve F has reached its steady state condition and the presentation on the screen of the cathode ray tube has a substantial usable or zero slope portion from $t_1'$ to $t_4$.

The correction of the flux from curve D to curve F is shown to be conveniently effected by L–C 58, 60 but it is to be understood that this correction may be alternatively produced by suitable modification of the feedback loop 50—56 to additionally shape the coil current in such manner as to increase the steepness of flux curve D to thereby increase the zero slope portion or the duration of the steady state condition. For example, it will be readily appreciated that the optimum coil current should be such as that shown by curve I and therefore it would be desirable to add only a regenerative coil current portion such as indicated by the shaded area I'.

The curves of Figs. 3–10 are observed as indicated below:

A—voltage at point 18,
B, E, I, L—current indicated by measurement of the voltage drop across resistor 70,
C, D, F—flux curves indicated by observation and measurement of the actual cathode ray trace on the face of the CRT screen as deflected by respective fluxes,
X—voltage across coil 12,
Y—voltage measured across variable resistor 54.

The circuitry of this invention has been described with reference to a square wave input. However, it will be readily appreciated that this flux lag due to core characteristics will also exist with other input wave forms which have a relatively short rise time and produce a large total flux change. The principle of this invention, regenerative shaping of the coil current to minimize the lag of flux change relative to coil current change, may obviously be utilized with such other input wave forms and the particular type of shaping required will be varied to suit the specific input. For example, the driving circuit described when used with a sin wave input can effectively increase the frequency response of the deflection yokes from an upper usable limit of about 3 kc. to about 11 kc. For this increase in frequency response the shaping circuit 50—56 is not needed and may be disconnected. The desirable increase is then produced in this type of yoke driving circuit by the gain increasing elements 58, 60 only which compensate for attenuation of flux and maintain a linear flux for an extended frequency range.

The voltage fed to differentiating elements 50, 52 has been shown as being derived from coil 12 but it will be seen that this corrective voltage may equally well be obtained from coil 10. In such an arrangement a phase inverter may be coupled between the coil and the capacitor 50. Further, the shaping network between coil 12 and amplifier 22 may be duplicated between coil 10 and amplifier 28.

Obviously many modifications and variations of the present invention are possible in the light of the above teachings. It is therefore to be understood that within the scope of the appended claims the invention may be practiced otherwise than as specifically described.

What is claimed is:

1. A circuit comprising a coil having a magnetic core, means for feeding a fluctuating input energy wave to said coil to produce a magnetic flux which varies in two directions in and about said core, and means for decreasing the relative difference between the rate of change of said flux in both directions and the rate of change of the energy in said coil.

2. A circuit comprising a coil having a magnetic core, means for feeding an input energy wave to said coil to produce a bi-directionally varying magnetic flux in and about said core, negative feedback means for modifying said input energy wave in accordance with the current in said coil, and means for decreasing the relative difference between the rate of change of said flux in both directions and the rate of change of the energy in said coil.

3. A circuit comprising a pair of coils having magnetic cores, means for feeding fluctuating input energy waves of opposite phase respectively to said coils to produce opposing magnetic fields in and about said cores, degenerative feedback means for effecting linearity of the currents in said coils relative to the respective input waves, and means responsive to variations of voltage in both directions across one of said coils for varying the linearity of said coil currents to decrease the relative difference between the rate of change of both said fields and the rate of change of the energy in respective coils.

4. A circuit comprising a coil having a magnetic core, means for feeding a varying input energy wave to said coil to produce a magnetic flux which increases and decreases in and about said core, and means for increasing the coil energy by energy of like phase to increase the linearity of both increases and decreases of core flux with respect to the input energy wave.

5. A circuit comprising a coil having a magnetic core, means for feeding a fluctuating energy wave to said coil to produce a bi-directionally varying magnetic flux in and about said core, degenerative feedback means for reducing coil current distortion due to reactance of said coil, and means for increasing the coil energy by energy of like polarity to decrease the rise time of the core flux in both directions.

6. A circuit comprising a pair of coils having magnetic cores, means for feeding varying input energy waves of inverted phase to said coils to produce opposing varying magnetic fields in and about said cores, and means for increasing the energy of both said coils by energy of like phase and polarity relative to the respective coil energies to decrease the lag in the rise time of respective input energy waves, said last mentioned means comprising a series connected resistor and capacitor coupled across one of said coils, and means for feeding a portion of the voltage developed across said resistor to said coils, said resistor and capacitor having a time constant of less than one tenth the half period of said input energy waves.

7. A circuit comprising a coil having a magnetic core, means for feeding an input energy signal to said coil to produce magnetic flux changes of alternating polarity in and about said core, and regenerative feedback means for decreasing the lag in the flux changes of both polarities relative to the coil energy changes which cause the flux changes.

8. A circuit comprising a coil having a magnetic core, means for feeding an alternating increasing and decreasing energy signal to said coil to produce a magnetic flux in and about said core, degenerative current feedback means for reducing distortion in the current of the coil due to reactance thereof, and means for decreasing the lag in the flux change relative to the coil energy change which causes the flux change, said last mentioned means comprising means for shaping both increasing and decreasing voltages developed across said coil and means for regeneratively mixing at least a portion of said shaped increasing and decreasing voltages with said input signal.

9. A feedback circuit comprising a coil having a magnetic core, amplifier means for supplying a fluctuating energy wave to said coil to effect a magnetic flux within the core, negative feedback means for reducing coil current distortion due to reactance of the coil and effect linearity of said current with respect to said input wave, means for obtaining a corrective energy wave having the same shape as the energy in said coil, but of opposite polarity, variable means for differentiating said corrective wave, variable amplitude limiting means for feeding said differentiated wave to the input of said amplifier whereby said linear coil current is shaped to decrease the total rise time of said flux.

10. A feedback circuit comprising a coil having a magnetic core, amplifier means for supplying a square wave input to said coil to effect a magnetic flux within the core, negative feedback means for reducing coil current distortion due to reactance of the coil to effect linearity of said current with respect to said input wave, means for obtaining a corrective energy wave having the same shape as the energy in said coil, but of opposite polarity, variable means for differentiating said corrective wave, variable amplitude limiting means for feeding said differentiated wave to the input of said amplifier whereby said linear coil current is shaped to decrease the total rise time of said flux, and means for increasing the amplifier gain for high frequencies to compensate for delay in rise time introduced by said differentiating means.

11. A deflection yoke amplifier circuit comprising first and second tubes each having a control grid, cathode and anode, first and second opposed deflection coils connected between said anodes, a core in each coil, a first negative amplifier for feeding a varying input signal to said first grid, a second negative amplifier having the input thereof coupled to said first cathode for feeding to said second grid a signal of opposite polarity relative to said input signal, adjustable means for supplying a first steady bias voltage to said first amplifier, and for supplying to said second amplifier a steady bias voltage equal to twice said first bias, first negative feedback means coupled between said first cathode and the input of said first amplifier, second negative feedback means coupled between said second cathode and the input of said second amplifier, and means for decreasing the total rise time of the flux in each coil relative to the rise time of the coil current which effects said flux.

12. A deflection yoke amplifier circuit comprising first and second tubes each having a control grid, cathode and anode, first and second opposed deflection coils connected between said anodes, a core in each coil, a first negative amplifier for feeding a varying input signal to said first grid, a second negative amplifier having the input thereof coupled to said first cathode for feeding to said second grid a signal of opposite polarity relative to said input signal, adjustable means for supplying a first steady bias voltage to said first amplifier, and for supplying to said second amplifier a steady bias voltage equal to twice said first bias, first negative feedback means coupled between said first cathode and the input of said first amplifier, second negative feedback means coupled between said second cathode and the input of said second amplifier, and regenerative feedback means coupled between one of said coils and the input of one of said amplifiers for decreasing the lag in the flux change of said cores relative to the coil energy change which causes said flux change.

13. A deflection yoke amplifier circuit comprising first and second tubes each having a control grid, cathode and anode, first and second opposed deflection coils connected between said anodes, a core in each coil, a first negative amplifier for feeding a varying input signal to said first grid, a second negative amplifier having the input thereof coupled to said first cathode for feeding to said second grid a signal of opposite polarity relative to said signal, adjustable means for supplying a first steady bias voltage to said first amplifier, and for supplying to said second amplifier a steady bias voltage equal to twice said first bias, first negative feedback means coupled between said first cathode and the input of said first amplifier, second negative feedback means coupled between said second cathode and the input of said second amplifier, adjustable means for differentiating the voltage across said second coil, and adjustable amplitude varying means for coupling said differentiating means with the input of said first amplifier.

14. The circuit of claim 13 including a series connected inductance and capacitance coupled between said cathodes.

References Cited in the file of this patent

UNITED STATES PATENTS

| | | |
|---|---|---|
| 2,439,324 | Walker | Apr. 6, 1948 |
| 2,447,507 | Kenyon | Aug. 24, 1948 |
| 2,521,741 | Parker | Sept. 12, 1950 |
| 2,629,006 | Oliver | Feb. 17, 1953 |
| 2,654,855 | Denton | Oct. 6, 1953 |
| 2,729,766 | Vilkomerson | Jan. 3, 1956 |
| 2,791,719 | Bliss | May 7, 1957 |